Figure 1:
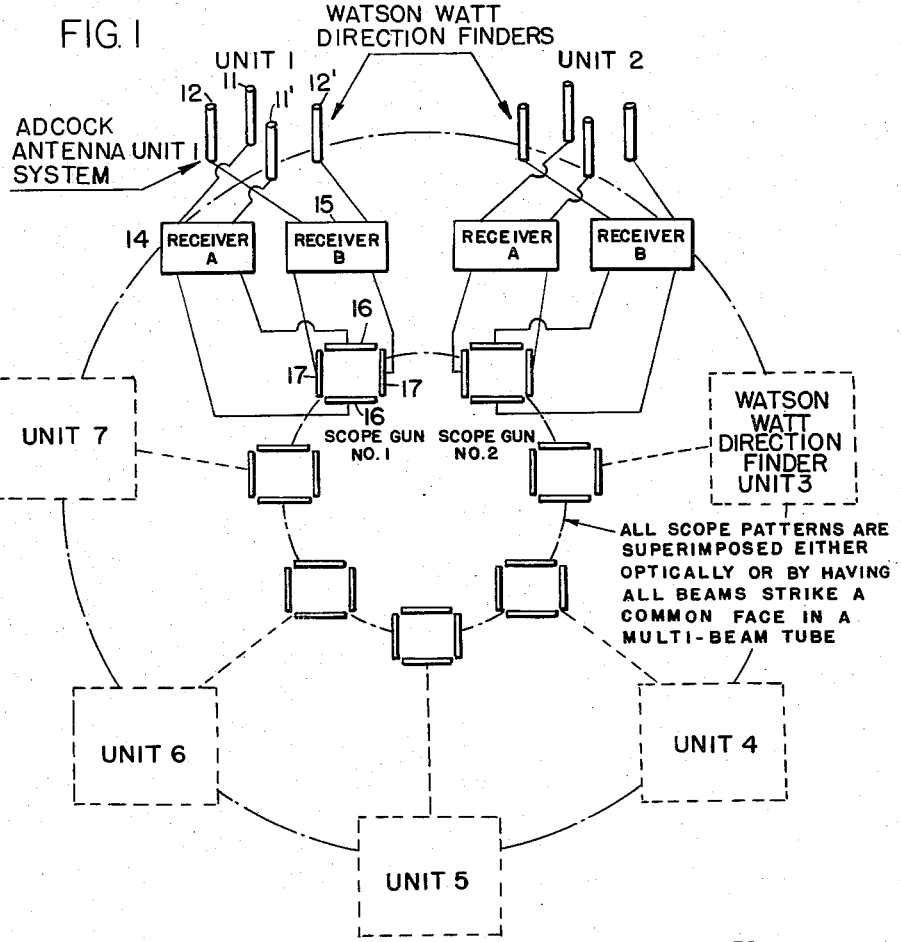

July 25, 1961 E. C. JORDAN ET AL 2,994,081
RADIO DIRECTION FINDER
Filed March 6, 1953

*INVENTORS:*
EDWARD C. JORDAN
HAROLD D. WEBB
THOMAS R. O'MEARA

BY
ATT'YS

United States Patent Office 2,994,081
Patented July 25, 1961

2,994,081
RADIO DIRECTION FINDER

Edward C. Jordan, Harold D. Webb, and Thomas R. O'Meara, Urbana, Ill., assignors, by mesne assignments, to the United States of America as represented by the Secretary of the Navy
Filed Mar. 6, 1953, Ser. No. 340,732
2 Claims. (Cl. 343—113)

The present invention relates to direction-finding systems; more particularly, the present invention relates to an accurate instantaneous bearing-indicating system for quickly indicating the presence and correct bearings of two or more received signals of the same frequency.

Existing direction-finding systems give accurate and quick results only where a single signal of a given frequency is being received. However, when more than one signal is received having a frequency which falls within the pass band of the receiving equipment, a false indication of signal bearing may be given since the apparatus usually indicates a direction which is the composite result of the two or more received signals.

The prime object of the present invention is to provide a novel direction-finding system which is capable of indicating the directions of arrival of two or more simultaneous signals of the same frequency.

A further object of the invention is to provide a direction-finding system capable of instantaneously resolving directions of arrival of energy waves which have reached the direction-finding equipment by different paths thereby making possible a more accurate bearing determination than is possible with existing direction-finding systems.

A still further object of the present invention is to provide a direction-finding system capable of simultaneously indicating the separate directions of arrival of more than one signal of the same frequency by utilizing a novel combination of existing direction-finding systems.

Another object of the present invention is to provide a direction-finding system capable of simultaneously presenting the separate directions of arrival of all signals being received of the same frequency making use of existing small-apertured instantaneous direction-finding apparatus.

Another object of the present invention is to provide a novel wide-apertured direction-finding system comprising a plurality of narrow-apertured direction-finding units in a manner such that the separate directions of arrival of a plurality of simultaneously received signals may be indicated on the face of a cathode-ray tube or other indicating surface.

Another object of the present invention is to provide a novel arrangement of directional-antenna units to present a beam trace on the face of a cathode-ray tube or similar indicating device having an envelope which is a polygon where the respective sides extend in a direction indicative of the direction of arrival of the received signals.

Briefly, one aspect of the present invention includes a plurality of direction-finding units where each unit includes an arrangement of energy-detecting elements and a signal-indicating means of the type which presents a radial line presentation when receiving only one signal, the radial position of which indicates the direction of arrival of the signal, and which system also presents an ellipse when two signals of the same frequency are simultaneously received. These directive energy-detecting elements are spaced about an area which is large relative to a square wave length of the signal frequency and arranged so that the corresponding direction patterns of each detecting unit are all parallel to those of the other units. The traces of each direction-finding unit are superimposed about a common axis to provide a polygon whose sides are parallel to the direction of arrival of the respective signals and whose relative lengths are a measure of the relative strengths of the associated signals.

Figure 2:
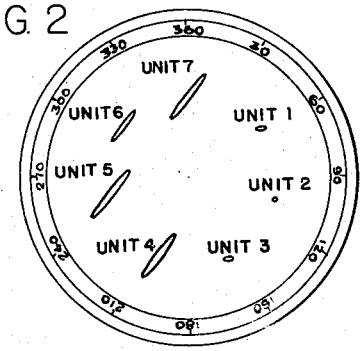
Figure 3:
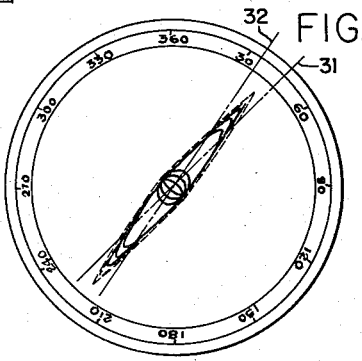

Other features, objects, and advantages of the present invention will become more apparent upon making reference to the specification, claims, and drawings wherein:

FIG. 1 is a simplified schematic diagram of the direction-finding system of the present invention;

FIG. 2 indicates the beam traces, resulting from the various direction finding units, that would be produced on the face of a multibeam cathode-ray tube; and FIG. 3 shows the face of the multibeam cathode-ray tube when all of the traces shown in FIG. 2 are superimposed about a common axis.

Reference should now be made to FIG. 1 which shows a schematic diagram of the preferred embodiment of the present invention. The embodiment illustrated therein comprises a plurality of narrow-apertured Watson-Watt or Adcock direction-finding systems of the type disclosed in the "Radio Engineers Handbook" by Terman, first edition, 1943, pages 884–886. In FIG. 1, the seven units 1–7 are spaced substantially equally about a circle whose diameter is considerably greater than the wave length at the operating frequency such as, for example, two wave lengths. Each direction-finding unit produces a visible trace on the screen of a multibeam cathode-ray tube which when superimposed upon another produces a figure from which the separate direction of arrival of each signal may be quickly ascertained.

In the immediate paragraphs to follow, the operation of only one of the direction-finding units will be discussed which will be followed by a discussion of the results when several systems are combined to form this invention.

Each of the narrow-apertured direction-finding units 1–7 includes two similar pairs of antennas such as 11—11', and 12—12' of unit 1 spaced at the corners of an imaginary square and which have substantially identical direction patterns arranged at right angles to each other. Each antenna pattern has a direction pattern following respectively the polar equation $P \sin \theta$ and $P \cos \theta$, where $P$ represents the maximum relative magnitude of sensitivity of an antenna pair, and $\theta$ is a space angle in a plane at right angles to the length of the Adcock antennas measured from a given reference line in the plane. The antenna pairs such as 11—11' and 12—12' are differentially coupled to radio receivers in the well-known manner. These radio receivers 14 and 15 respectively may be conventional superheterodyne receivers which amplify the resultant signals from the associated antenna pair and convert the antenna voltage to a more practical frequency. The output of each receiver is then fed respectively to the horizontal and vertical deflecting means of a cathode-ray tube such as deflecting means 16 and 17 to provide a trace on the face of the latter cathode-ray tube. The deflection means of each unit are related with respect to those of the other units to produce a superimposed trace.

If more than one signal is received by a given direction-finding unit at the same frequency, instead of presenting a radial line on the face of the cathode-ray tube associated with the later direction-finding unit which would give an accurate indication of signal direction, an ellipse may appear on the face of the oscilloscope which would make the system unsatisfactory for accurate bearing indication of either one or both signals which have been received. If the two signals of the same frequency are arriving from different directions as is common in multipath transmission, deflection in general will be an ellipse, but will be a straight line if the two signals are exactly in phase or 180 degrees out of phase. In any event, the resultant bearing indicated on the face of a cathode-ray tube will not be an accurate bearing since one of the signals will interfere with the accuracy of the indication of the other.

If the two signals come from different direction but are of different frequencies such that both frequencies are in the pass band of the receiver, the Lissajous figure produced on the cathode-ray tube screen forms a parallelogram whose sides are parallel to the directions of arrival of the two signals indicated on the tube screen. That is to say the envelope of the traces presented will be a parallelogram. If the two signals are at the same frequency and are allowed to vary in time phase with each other slowly, the envelope of the various ellipses formed will be a parallelogram. If there are several signals from different directions all varying in time phase with each other, the envelope of the trace on the cathode-ray tube will be a polygon having pairs of parallel sides parallel to the direction of arrival of each one of the signals.

Because of signal reflections from the ionosphere and from the ground or other surfaces, it is quite often possible that a given signal will reach a receiving antenna by two separate paths. In such a situation the time-phase relationship between the two received signals may be either constant or slowly varying so that the elliptical trace appearing on the face of a single beam cathode-ray tube will not indicate the separate directions of arrival of the two received waves by giving a polygon envelope trace or any other trace that is readily ascertainable. In order to overcome the situation, a plurality of antenna systems of the type just described are spaced from each other to form a wide-apertured system wherein each direction finding unit will produce from two or more signals a single ellipse which when superimposed with the ellipses of all of the other units will present a polygon which will indicate the separate directions of arrival of the two or more simultaneously received signals. It is of utmost importance, however, that the directivity patterns of the antenna array of each direction-finding unit be substantially identical in shape and direction to the antenna arrays of all of the other direction-finding units. Where the direction-finding units are spaced evenly throughout an area several square wave lengths in extent, the time-phase differences between the two signals as received by the various direction-finding units will vary appreciably from unit to unit. Then when the several traces of the cathode-ray beam associated with each unit are superimposed, the envelope of the combined traces forms a polygon which may readily be discerned.

The arrangement shown in FIG. 1, wherein seven Adcock direction finding units are spaced evenly about a circle having a diameter greater than two wave lengths, is an example of a system where the differences of phase should be reasonably evenly spaced from 0 to 180 degrees, and consequently the ellipses indicating the bearings for each direction-finding unit should represent sufficiently divergent inclinations of all possible ellipses resulting from all possible time-phase differences that the envelope of the superimposed traces would give an indication which would be readily readable to indicate the separate directions of arrival of each signal. The various ellipses could then be optically superimposed on the face of a multibeamed cathode-ray tube having a common envelope as represented by the deflecting plates shown in FIG. 1. In the alternative manner, separate cathode-ray tubes could be used with the various ellipses optically superimposed utilizing a lens system which would direct traces on the faces of separate cathode-ray tubes to a single reflecting screen.

It should be apparent that the receivers and associated circuits of each Adcock unit should have similar gain and phase characteristics.

Reference should be made to FIG. 2 which shows on the face of a single multibeam cathode-ray tube how the different non-superimposed ellipses would look as produced by the various Adcock antenna units shown in FIG. 1 where the circle about which the units are spaced has a diameter of five wave lengths at the operating frequency, and the relative phases of the two signals as received at the center of the antenna array differ by 37½ degrees.

FIG. 3 indicates the resultant trace when the various ellipses shown in FIG. 2 are superimposed about a common axis and the dotted lines outline the envelope of that figure. The two lines 31 and 32 drawn through the center of the parallelogram parallel to the two pairs of sides indicate the separate directions of arrival of two simultaneously received signals of the same amplitude. The bearing of the signals producing this trace are respectively 45 and 35 degrees. Note especially from FIG. 2 that at some locations in the interference field, such as at the location of the antenna units for direction-finding units 1, 2, and 3, that the time-phase difference is nearly 180 degrees. The electromagnetic field is therefore nearly cancelled and the antenna pickup and bearing indication are extremely small.

This technique for resolving the direction of arrival of two interfering signals can be extended to three or more interfering signals. For three incoming signals the envelope of the superimposed ellipses would be a six-sided polygon with opposite sides parallel respectively to the directions of arrival of the signals they represent and have lengths proportional to the relative magnitude of the signals. Thus, it is seen that the six-sided polygon completely resolves the three signals exactly as the quadrilateral resolves two signals.

If it is equally probable that a signal will arrive from any direction, then a circular distribution of antenna units will probably give the best average operation. If, however, the majority of the signals are expected to arrive from a particular sector, then some other distribution such as a linear or semicircular distribution would give optimum performance; that is to say, it would assure a maximum number of ellipses of widely varied inclinations for the number of unit systems employed.

For a situation where the operator does not have time to draw a line tangent to the various ellipses indicated on the face of the cathode-ray tube, the line bisecting the composite figure will give the bearing that will be very close to the correct one where the angular separation of signals is small. This bearing can be determined the very instant the signals arrive.

This invention makes it possible to get accurate bearings of multipath transmissions of a single frequency at the instant that the signal arrives, thereby making it possible to get accurate bearings on flash transmissions that may last for only a fraction of a second.

It should be understood that numerous modifications may be made of the specific embodiment described without deviating from the broader more generic aspects of the invention.

For example, a crossed-loop system of antennas may be substituted for the Adcock antenna arrangement shown in FIG. 2.

The present invention is applicable both to the electromagnetic systems such as radar and radio as well as to sound systems such as sonar. Accordingly, the term "antenna" used in the claims is meant to apply to any energy-detecting element having the desired directivity characteristics above mentioned.

We claim:

1. A direction-finding system for simultaneously indicating the direction of arrival of more than one sinusoidal varying signal of the same frequency comprising a plurality of direction-finding units each including directive energy-detecting elements and a signal-indicating means of the type which presents a radial line presentation when receiving only one signal, the radial position of which indicates the direction of arrival on the signal, and which presents an ellipse when two signals of the same frequency are simultaneously received, the directive energy-detecting units being spaced about an area whose dimensions are large relative to a wave length and arranged so that the corresponding directivity patterns of each unit are all parallel to each other, means for superimposing the traces of the indicating means of each direction-finding unit about a common axis whereby the envelope of the superimposed traces defines a polygon having a pair of sides parallel to the direction of arrival of each signal, the lengths of the sides being proportional to the strengths of the respective associated signals.

2. A direction-finding system for simultaneously indicating the direction of arrival of more than one sinusoidal varying signal of the same frequency comprising a plurality of direction-finding units each including directive energy-detecting elements and a signal-indicating means of the type which presents a radial line presentation when receiving only one signal, the radial position of which indicates the direction of arrival of the signal, and which presents an ellipse when two signals of the same frequency are simultaneously received, directive energy-detecting elements of each direction-finding unit spaced to form a wide-apertured system and arranged so that the corresponding directivity patterns of each unit are all parallel to each other, means for superimposing the traces of the indicating means of each direction-finding unit about a common axis whereby the envelope of the superimposed traces defines a polygon having a pair of sides parallel to the direction of arrival of each signal, the lengths of the sides being proportional to the strengths of the respective associated signals.

References Cited in the file of this patent

UNITED STATES PATENTS

| | | |
|---|---|---|
| 2,183,634 | Zworykin | Dec. 19, 1939 |
| 2,209,191 | Dearing | July 23, 1940 |
| 2,238,951 | Smith | Apr. 22, 1941 |
| 2,344,296 | Frink | Mar. 14, 1944 |
| 2,399,671 | Gage | May 7, 1946 |
| 2,402,688 | Skurnick | July 25, 1946 |
| 2,408,039 | Busignies | Sept. 24, 1946 |
| 2,422,100 | Huff | June 10, 1947 |
| 2,428,966 | Gage | Oct. 14, 1947 |
| 2,530,828 | Leverenz | Nov. 21, 1950 |